United States Patent
Hansen et al.

(10) Patent No.: US 11,277,081 B2
(45) Date of Patent: Mar. 15, 2022

(54) DEVICE AND METHOD FOR SWITCHING IN AND OUT A START WINDING OF A SINGLE PHASE AC MOTOR

(71) Applicant: Flint & Walling, Inc., Kendallville, IN (US)

(72) Inventors: Eric J. Hansen, Fort Wayne, IN (US); Adam J. Cohen, Auburndale, MA (US); Josh E. Tang, Westford, MA (US)

(73) Assignee: Flint & Walling, Inc., Kendallville, IN (US)

( * ) Notice: Subject to any disclaimer, the term of this patent is extended or adjusted under 35 U.S.C. 154(b) by 0 days.

(21) Appl. No.: 15/477,241

(22) Filed: Apr. 3, 2017

(65) Prior Publication Data
US 2017/0288577 A1    Oct. 5, 2017

Related U.S. Application Data

(60) Provisional application No. 62/318,363, filed on Apr. 5, 2016.

(51) Int. Cl.
*H02P 1/42* (2006.01)
*H02P 25/04* (2006.01)

(52) U.S. Cl.
CPC .............. *H02P 1/42* (2013.01); *H02P 25/04* (2013.01)

(58) Field of Classification Search
CPC .................................. H02P 1/42; H02P 25/04
USPC ....................................................... 318/789
See application file for complete search history.

(56) References Cited

U.S. PATENT DOCUMENTS

| | | | | |
|---|---|---|---|---|
| 3,307,093 A | * | 2/1967 | Wright | H02P 1/426 318/786 |
| 3,414,789 A | | 12/1968 | Prouty | |
| 3,489,969 A | * | 1/1970 | Knauer | H02P 1/426 318/787 |
| 3,497,785 A | * | 2/1970 | Wood | H02P 1/42 318/781 |
| 3,519,911 A | | 7/1970 | Frank | |
| 3,538,411 A | * | 11/1970 | Knauer | H02P 1/44 318/787 |
| 3,671,830 A | * | 6/1972 | Kruper | H02P 1/44 318/786 |
| 3,740,632 A | * | 6/1973 | Whitney | H02P 1/42 318/289 |
| 3,761,792 A | * | 9/1973 | Whitney | H02P 1/44 318/788 |
| 3,792,324 A | * | 2/1974 | Suarez | H02P 1/445 318/786 |

(Continued)

*Primary Examiner* — Muhammad S Islam
*Assistant Examiner* — Devon A Joseph
(74) *Attorney, Agent, or Firm* — Scott R. Cox; Jessica C. Ronald; Jeffery P. Langer

(57) ABSTRACT

A device for switching in and out a start winding of a single phase AC motor using an energizer winding to generate voltage which can be used to power a simple timing switch circuit. The AC voltage is rectified and converted to DC voltage. The DC voltage is then used to drive a normally closed solid state switch to an open state which in turn inactivates a triac connected to the start winding in the motor. The "on time" of the start winding is controlled by a RC circuit that ramps the voltage to the gate of a FET that drives current through the normally closed solid state switch.

7 Claims, 2 Drawing Sheets

(56) References Cited

U.S. PATENT DOCUMENTS

| | | | | |
|---|---|---|---|---|
| 3,855,509 A | * | 12/1974 | Wright | H02P 1/44 |
| | | | | 318/753 |
| 3,882,364 A | * | 5/1975 | Wright | H02P 1/44 |
| | | | | 318/786 |
| 4,292,555 A | * | 9/1981 | Schaefer | H01H 61/002 |
| | | | | 310/68 R |
| 4,325,012 A | | 4/1982 | Schaefer | |
| 4,399,394 A | | 8/1983 | Ballman | |
| 4,486,700 A | * | 12/1984 | Kawate | H02P 1/42 |
| | | | | 318/781 |
| 4,496,895 A | * | 1/1985 | Kawate | H02P 1/42 |
| | | | | 318/781 |
| 4,604,563 A | | 8/1986 | Min | |
| 4,622,506 A | * | 11/1986 | Shemanske | H02P 1/42 |
| | | | | 318/785 |
| 4,658,195 A | | 4/1987 | Min | |
| 4,782,278 A | * | 11/1988 | Bossi | H02P 1/44 |
| | | | | 318/786 |
| 4,862,053 A | * | 8/1989 | Jordan | H02P 1/44 |
| | | | | 318/786 |
| 5,589,753 A | * | 12/1996 | Kadah | H02P 1/42 |
| | | | | 318/785 |
| 5,811,866 A | | 9/1998 | Hirata | |
| 5,811,955 A | | 9/1998 | Kachuk | |
| 6,122,154 A | * | 9/2000 | Damerow | H02P 1/42 |
| | | | | 361/105 |
| 6,570,359 B2 | | 5/2003 | Dubhashi | |
| 7,061,204 B2 | | 6/2006 | Unno | |
| 7,777,438 B2 | * | 8/2010 | Schmidt | H02P 1/445 |
| | | | | 318/430 |
| 10,416,690 B2 | * | 9/2019 | Koehl | F04B 49/065 |
| 2005/0184699 A1 | * | 8/2005 | Unno | H02P 1/423 |
| | | | | 318/786 |

* cited by examiner

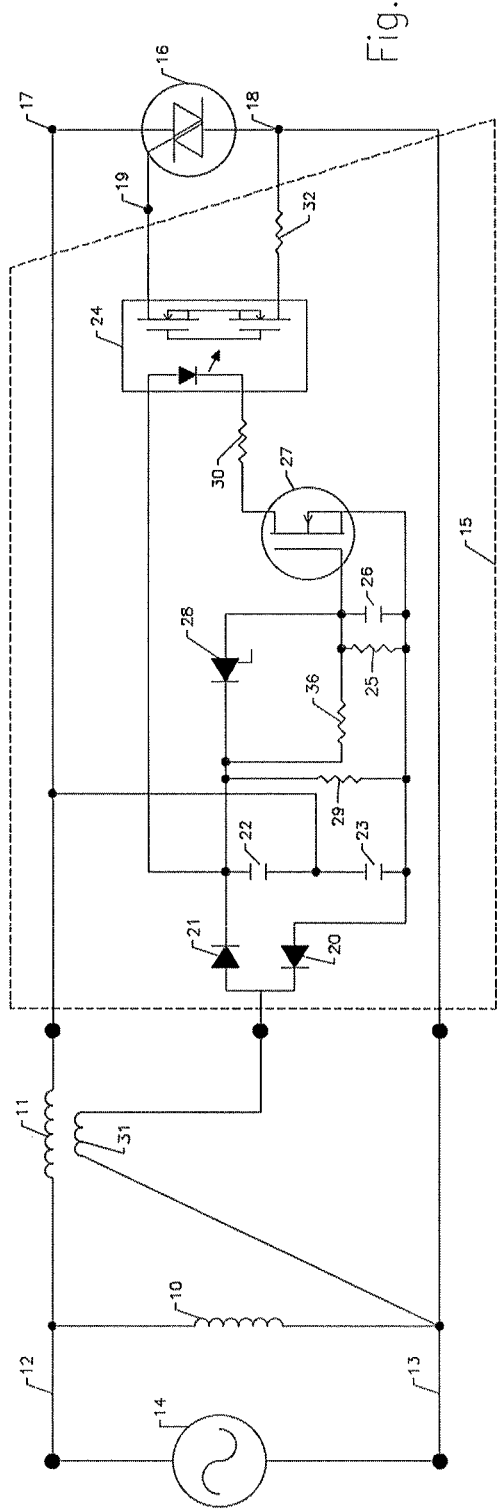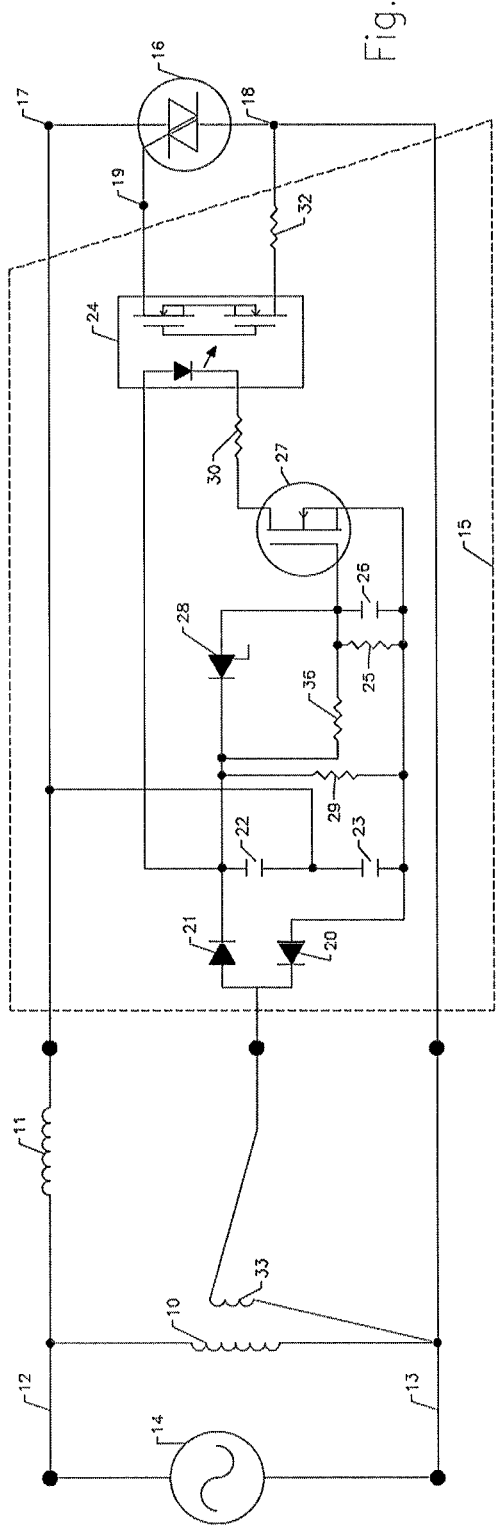

DEVICE AND METHOD FOR SWITCHING IN AND OUT A START WINDING OF A SINGLE PHASE AC MOTOR

CROSS REFERENCE TO RELATED APPLICATION

This Application claims priority from provisional application Ser. No. 62/318,363, filed Apr. 5, 2016.

BACKGROUND OF THE INVENTION

Field of Invention

Starting a single phase motor often requires that a second phase be utilized to generate induced current in a rotor. Once the rotor starts, the second phase can be disconnected as the spinning rotor generates its own induced current from the single phase in the stator. As this method of generation of the second phase is not energy efficient, and requires large, expensive energy storage components, it is beneficial to remove it from the circuit once the motor starts.

There are several devices using different methods common in the industry for disconnecting the start winding once the rotor is spinning at a sufficient rate to generate induced current.

One involves a switch that is actuated by a centripetal force created when the motor spins above a certain rpm. In this system a spring returns the switch to a connected position when the motor stops.

In another system, various electronic control circuits are utilized with an AC induction motor having a main winding and a start winding. The control circuits include a triac connected in series with the start winding and a timing circuit connected to the gate of the triac for turning it on, and thus energizing the start winding for a certain time interval measured from initial energization of the motor. The timing circuit includes a PTC resistor which heats to its transition temperature during the time interval and turns off the triac when heated above its transition temperature.

Another embodiment involves use of a control circuit designed to control energization of the start winding of the AC motor which includes a main winding and start winding. The control circuit includes switch means connected to the start winding, heat responsive means connected to the switch means and includes a self-heating part and a current source coupled to the motor windings, the current serving to heat the self heating part and to operate the switch means to control the start winding. See U.S. Pat. Nos. 4,325,012 and 4,292,555.

In an alternative device and method, a relay is configured in a normally closed configuration so the start winding is engaged immediately when power is applied to the motor. The start winding is disconnected when a bi-metalic relay switches. This is accomplish by a third winding that is embedded in the motor called an energizer winding. The energizer winding is connected to the bi-metalic relay. When the motor starts spinning, induced current is created in the energized winding that heats the bi-metalic element causing the relay to switch off, disconnecting the start winding. As long as the motor continues spinning, sufficient heat is generated for the bi-metalic element to keep the relay energized and the start winding disconnected. Once power is removed, or the motor slows below a certain rpm, insufficient induced electrical power is created to keep the relay in the "open" position and the relay switches, re-connecting the start winding.

There are several disadvantages to this method and device including:

It is difficult and/or expensive to design and manufacture the bi-metalic relay so that it heats and switches at the same rate.

Each switch needs to be individually calibrated.

Depending on the start-up conditions, different inductive power is induced in the energizer winding, which also affects the switch time.

Since the switch point is determined by heat, the time it takes for the system to cool and reset is long and uncontrolled, demanding that the off time until power is reapplied motor restart be long to account for a worst case.

The starting temperature of the bi-metalic relay affects the start time of the motor.

A bi-metalic relay is not a solid state device and therefore has a much lower reliability In one embodiment the disclosed device and method improve on the shortcomings listed above. This device uses the energizer winding not to generate current, which in turn generates heat to cause a relay to actuate, but to generate voltage which can be used to power a simple timing switch circuit. In this embodiment the AC voltage is rectified and converted to DC voltage. The DC voltage is then used to drive a normally closed solid state switch (NCSS) to an open state, which in turn inactivates a triac connected to the start winding in the motor, similar to the bi-metalic device. The "on" time of the start winding is controlled by an RC circuit that ramps the voltage to the gate of a FET that drives current through the NCSS. Other timing circuits may be included with this concept, including counters, oscillators and microcontrollers.

The foregoing and other objects and features of the present invention may be better understood from the following detailed description and accompanying figures of the drawings showing an embodiment with alternative embodiments of the invention.

BRIEF DESCRIPTION OF THE DRAWINGS

FIG. 1 is a schematic diagram of a control circuit in accordance with the invention.

FIG. 2 is a schematic diagram similar to FIG. 1 but illustrating an alternate form of the invention.

Figure 3:
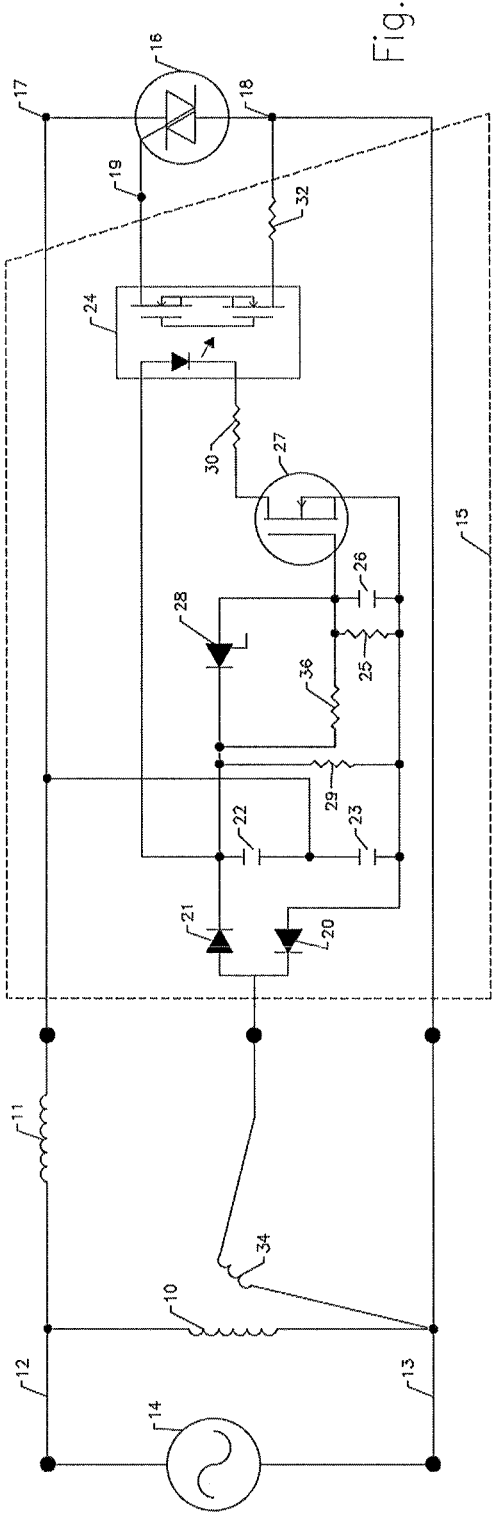
FIG. 3 is a schematic diagram similar to FIG. 1 but illustrating another alternate form of the invention.

Components of these Figures are shown with component numbers in a description added after the Detailed Description.

DETAILED DESCRIPTION OF ONE EMBODIMENT OF THE INVENTION

FIG. 1 schematically illustrates an AC electric motor of the split-phase induction type, including a main winding 10 and a start winding 11. The two windings 10 and 11 are wound on the stator (not shown) of an electric motor and are angularly displaced by 90 electrical degrees. As is well known to those skilled in the art, starting torque for the motor is attained by providing the start winding 11 with a different phase angle from the main winding 10, thereby producing a time or phase displacement between the two windings. One side of each of the windings 10 and 11 is connected to a power supply line 12, and the other side of the main winding 10 is connected to a power line 13. The two lines 12 and 13 are adapted to be connected to an AC power supply 14 such as a 60-cycle single phase AC power source.

While the main winding 10 is connected directly across the two power supply lines 12 and 13, the start winding 11 is connectable across the two supply lines by a control circuit which enables energization of the start winding 11 during a short timing interval or period at initial energization of the motor. This time interval may, for example, be one-half second in length. As will be described hereinafter, the start winding 11 may also be reenergized if the motor stalls. The control circuit comprises a selectively closable bi-directional electronic switch such as the type commonly known as a triac, indicated by the reference numeral 16. The triac 16 comprises a first main or power terminal 17, a second main or power terminal 18, and a gate 19. The triac 16 offers a low resistance path between the main terminals 17 and 18, when in each AC half cycle, a potential appears across the main terminals and a trigger signal appears on the gate 19. The triac 16 otherwise presents a very high resistance, or open circuit to current flow between the main terminals 17 and 18. The main terminal 17 is connected to the start winding 11 and the other main terminal 18 is connected to the power line 13. It will be apparent therefore that the start winding 11 and the triac 16 are connected in series and they are connected across the power lines 12 and 13 in parallel with the main winding 10, and when the triac 16 is closed or triggered, the start winding 11 will be energized.

A trigger circuit 15 is also provided in the control circuit to trigger the triac 16 into conduction. The trigger circuit 15 uses the exciter winding coil (EW) 31 which generates a voltage (to be explained below) which can be used to power a simple timing switch circuit.

The EW 31 is connected between the Schottky diodes 20, 21 and the power line 13. The EW 31 is mounted on the motor stator concentric with or on the axis of the start winding 11 so that voltage will be induced in the EW 31.

Considering the operation of the circuit illustrated in FIG. 1, when the power lines 12 and 13 are connected to an AC power supply, current flows through the main winding 10. Normally closed solid state switch (NCSS) 24 is defaulted so that the start winding 11 is connected when power is applied to the motor. This is important because without the start winding 11 being engaged, insufficient voltage is generated in the EW 31 to actively turn on the switch. Since the NCSS 24 is normally closed, the triac 16 is activated allowing current to flow through the start winding 11 within a half cycle of supply voltage. The storage capacitors 22, 23 for the DC voltage have to be of sufficient capacity to maintain the needed voltage throughout the 60 Hz cycle.

As shown in FIG. 1, the exciter winding coil 31 is mounted concentrically with or on the axis of the start winding 11, and consequently current flowing through the start winding 11 induces a voltage in the coil 31. The induced AC voltage is rectified and converted to DC. The DC voltage is then used to drive the normally closed solid state switch (NCSS) 24 to an open state, which in turn inactivates the triac connected to the start winding 11 in the motor. Both ends of an EW are connected to a voltage doubler since it is desired to have as few windings as possible in the EW. A doubler, consisting of two Schottky diodes 20, 21, is used to maximize the DC voltage from the AC voltage created by the EW. The output of the doubler charges two capacitors 22, 23 of sufficient size to maintain the required DCV during the 60Hz cycle for powering the opto-isolated NCSS 24. The switch time of the NCSS 24 is controlled by resistors 25, 35 and capacitor 26 connected to the gate of a FET 27 (instead of a FET, different switching devices can be used with more or less accuracy in the switch point, such as a Schmitt trigger inverter from TI, such as part number, SN74AUC1G14DCDR. In one embodiment, a FET is used such as Fairchild, FDV303N.) The output of the FET is used to drive the NCSS 24 via the DC power generated in the output capacitors 22, 23, of the voltage doubler. The length of time interval or period is determined by the values of resistors 25, 35 and capacitor 26. For a motor designed to drive a water well pump for example the cut-out speed is reached in approximately 0.5 seconds.

One advantage with using an RC 25, 35, 26 in conjunction with a FET 27 as opposed to more complex logic is that all the power being generated is used to drive the triac switch opto-isolator (except for the smallest amount of power used to overcome the discharge resistor connected to the logic level FET 27 that drives the NCSS 24).

Figure 4:
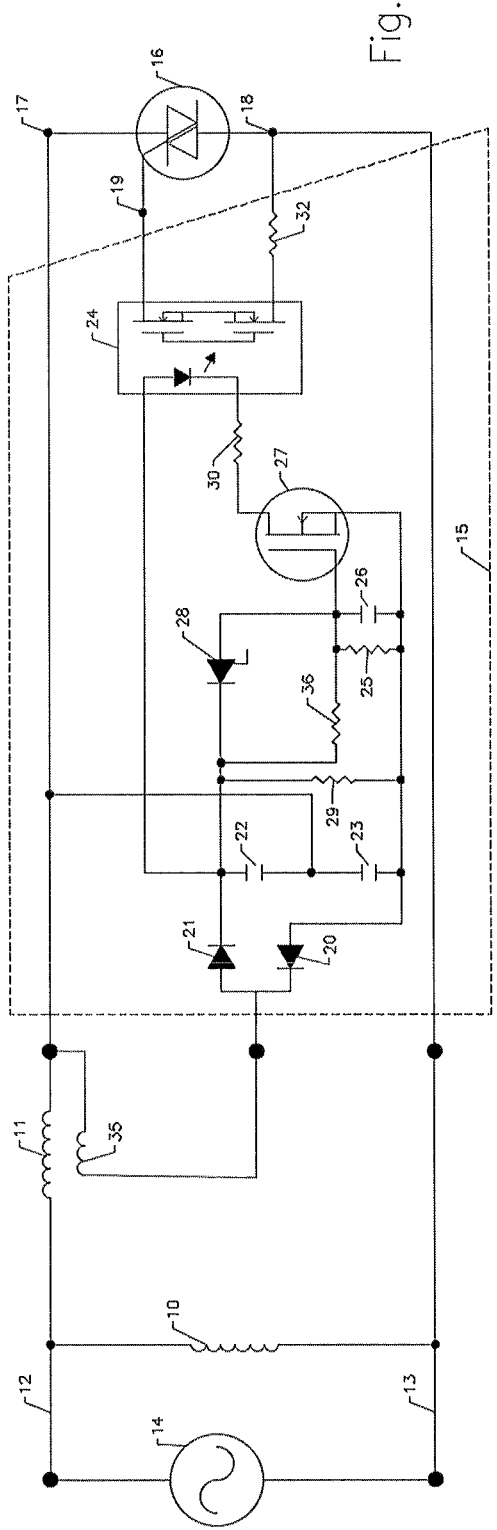
FIG. 4 is a schematic diagram similar to FIG. 1 but illustrating yet another alternate form of the invention.

While the exciter winding coil 31 may be inductively coupled with the start winding 11 as shown in FIGS. 1 and 4, or with the main winding 10 as shown in FIG. 2, or in a position in between as shown in FIG. 3, the position illustrated in FIGS. 1 and 4 is preferred for most motor applications. In the event that the motor is stalled, the main winding 10 will continue to be energized but the rotor will not turn and voltage will no longer be induced in the coil 31. As soon as the voltage stops being induced in EW 31, a reset function is performed by the back-facing diode 28 and resistor 29, which discharges the timing and storage capacitors 22, 23 and 26. This allows the NCSS 24 to activate the triac 16 and allows the start winding 11 to be reenergized. Normally, the motor will start-up again and the capacitor 26 will recharge and time out the start winding 11. Of course, an overload device should be provided between the lines 12 and 13 to protect the motor against damage in the case where the motor continues to be stalled after the start winding is reenergized.

By the disclosed device the disadvantages of prior art systems are overcome. A more consistent system is designed for a consistent rate for restart is produced. The difficulties associated with the use of heating and cooling of the system, as are present with prior art systems, are overcome because of the use of the system to generate voltage. Further, the current system uses a solid state device which has much higher reliability.

It is recognized that various alternatives and modifications are possible within the scope of the appended claims.

COMPONENT NUMBER DESCRIPTION 10 main winding
11 start winding
12 power supply line
13 power supply line
14 AC Power supply
15 Trigger Circuit
16 bi-directional electronic switch (triac)
17 triac first main or power terminal
18 triac second main or power terminal
19 tirac gate terminal
20 Schottky diode
21 Schottky diode
22 capacitor
23 capacitor
24 normally closed solid state switch (NCSS)
25 resistor 26 capacitor
27 FET
28 diode
29 resistor
30 resistor
31 exciter winding coil on axis of start winding
32 resistor
33 exciter winding coil on axis of main winding
34 exciter winding coil between main start winding
35 exciter winding coil connected to one side of start winding
36 resistor

The invention claimed is:

1. A single phase AC motor containing a start winding circuit comprising
   a rotor, and
   a stator, wherein the stator is wound with a main winding, a start winding, and an exciter winding coil,
   wherein the exciter winding is separate and distinct from the main winding and the start winding,
   wherein the exciter winding coil is connected to an AC-DC convertor to generate DC voltage to power a voltage controlled_timing switch circuit to activate and inactivate the start winding of the motor, and
   wherein said exciter winding is wound between said start and main windings.

2. A start winding cut-out circuit for a single phase AC electric motor, wherein the motor contains a stator with a main winding, and a start winding each wound on said stator; wherein said circuit comprises a) an exciter winding, separate and distinct from the main winding and the start winding and also wound on said stator, which exciter winding is magnetically coupled to the start winding, the main winding, or both which induce voltage in said exciter winding to power said circuit, b) a normally closed solid state switch connected to a gate of a Triac, which Triac is connected to the start winding, which normally closed solid state switch actuates in response to voltage from said exciter winding, and c) a voltage controlled timing circuit connected to the normally closed solid state switch comprising a resistor and capacitor to control actuation of said normally closed solid state switch and Triac, wherein said Triac and said start winding are connected in series, and wherein said Triac and start winding are connected in parallel with said main winding.

3. The circuit as in claim 2, wherein said exciter winding is wound on the axis of said start winding.

4. The circuit as in claim 2, wherein said exciter winding is wound on the axis of said main winding.

5. The circuit as in claim 2, wherein said exciter winding and said trigger means are connected to one side of said start winding.

6. The circuit as in claim 2, wherein said exciter winding is substantially seventy electrical degrees from the main winding.

7. A single phase AC motor adapted to be connected across AC power supply lines comprising
   a rotor,
   a stator, wherein the stator is wound with a main winding, a start winding, and an exciter winding,
   wherein the main winding is connected across the AC power supply lines,
   an electronic switch in series with the start winding and wherein the electronic switch and start winding are connected across the AC power supply lines,
   a voltage controlled trigger circuit connected to and adapted to control the electronic switch,
   wherein the exciter winding is separate and distinct from the main winding and the start winding, and
      wherein the exciter winding is connected between the AC power supply lines and the voltage controlled trigger circuit, whereby the start winding of the motor is activated and inactivated .

* * * * *